(12) United States Patent
Fujikura

(10) Patent No.: US 9,619,190 B2
(45) Date of Patent: Apr. 11, 2017

(54) PRINTING SYSTEM

(71) Applicant: KYOCERA Document Solutions Inc., Osaka (JP)

(72) Inventor: Akira Fujikura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/003,865

(22) Filed: Jan. 22, 2016

(65) Prior Publication Data

US 2016/0224292 A1    Aug. 4, 2016

(30) Foreign Application Priority Data

Jan. 30, 2015   (JP) ................................. 2015-016544
Jan. 30, 2015   (JP) ................................. 2015-016556

(51) Int. Cl.
    *G06F 15/00*      (2006.01)
    *G06F 3/12*      (2006.01)
    *H04N 1/00*      (2006.01)

(52) U.S. Cl.
CPC .......... *G06F 3/1238* (2013.01); *G06F 3/1222* (2013.01); *G06F 3/1224* (2013.01); *G06F 3/1292* (2013.01); *H04N 1/00244* (2013.01); *H04N 1/00307* (2013.01);
(Continued)

(58) Field of Classification Search
None
See application file for complete search history.

(56) References Cited

U.S. PATENT DOCUMENTS

| | | | |
|---|---|---|---|
| 7,965,401 | B2 | 6/2011 | Ishimaru |
| 8,830,496 | B2 | 9/2014 | Itogawa et al. |
| 2008/0007767 | A1 | 1/2008 | Ishimaru |

(Continued)

FOREIGN PATENT DOCUMENTS

| | | |
|---|---|---|
| JP | 2008-017381 A | 1/2008 |
| JP | 2012-118922 A | 6/2012 |

(Continued)

OTHER PUBLICATIONS

An Office Action issued by the Japanese Patent Office on Jul. 5, 2016, which corresponds to Japanese Patent Application No. 2015-016556; and is related to U.S Appl. No. 15/003,865.

(Continued)

*Primary Examiner* — Saeid Ebrahimi Dehkord
(74) *Attorney, Agent, or Firm* — Studebaker & Brackett PC

(57) ABSTRACT

A printing system includes an image forming apparatus, a server, and a mobile device. The image forming apparatus includes an identification information sending section that sends identification information via radio waves. The server includes a print data managing section that manages print data in association with user information. The mobile device includes an identification information receiving section that receives the identification information. The mobile device transmits to the server the user information and the identification information associated with the user information. The server performs a specific operation for causing the image forming apparatus corresponding to the identification information associated with the user information to execute a print job based on print data managed in association with the user information transmitted.

8 Claims, 12 Drawing Sheets

(52) U.S. Cl.
CPC ..... *H04N 1/00315* (2013.01); *H04N 1/00854* (2013.01); *H04N 2201/0094* (2013.01)

(56) References Cited

U.S. PATENT DOCUMENTS

| | | |
|---|---|---|
| 2012/0212766 A1 | 8/2012 | Imamoto |
| 2012/0250059 A1 | 10/2012 | Itogawa et al. |
| 2014/0355050 A1* | 12/2014 | Sakai .................... G06F 3/1204 358/1.15 |

FOREIGN PATENT DOCUMENTS

| | | |
|---|---|---|
| JP | 2012-187915 A | 10/2012 |
| JP | 2012-212330 A | 11/2012 |

OTHER PUBLICATIONS

An Office Action issued by the Japanese Patent Office on Jul. 5, 2016, which corresponds to Japanese Patent Application No. 2015-016544; and is related to U.S Appl. No. 15/003,865.

\* cited by examiner

52b Image forming apparatus managing information

| Tag information | IP address or host name |
|---|---|
| abc123 | ○○○. ○○○. ○○○. ○○○ |
| ⋮ | ⋮ |

FIG. 7

PRINTING SYSTEM

INCORPORATION BY REFERENCE

The present application claims priority under 35 U.S.C. §119 to Japanese Patent Application Nos. 2015-16556 and 2015-16544, filed on Jan. 30, 2015. The contents of these applications are incorporated herein by reference in their entirety.

BACKGROUND

The present disclosure relates to a printing system that causes an image forming apparatus to execute a print job based on print data managed by a server.

A typical printing system has been known that causes an image forming apparatus to execute a print job based on print data managed by a server. In the printing system, position information of a user carrying a mobile device obtained via a function of a global positioning system (GPS) of the mobile device is transmitted to the server. The server calculates an inter-device distance between the mobile device and the image forming apparatus based on the position information of the mobile device. The print data managed by the server is then transmitted to the image forming apparatus according to the inter-device distance.

SUMMARY

A printing system according to the present disclosure includes an image forming apparatus, a server, and a mobile device. The image forming apparatus includes an identification information sending section. The identification information sending section sends identification information via radio waves. The server includes a print data managing section. The print data managing section manages print data in association with user information. The mobile device includes an identification information transmitting section. The identification information transmitting section receives the identification information sent via radio waves by the identification information sending section. The mobile device includes an information transmitting section. The information transmitting section transmits to the server the user information and the identification information received by the identification information receiving section in association with the user information. The server includes a specific operation executing section. The specific operation executing section performs a specific operation for causing the image forming apparatus corresponding to the identification information transmitted by the information transmitting section in association with the user information to execute a print job based on the print data that is managed by the print data managing section in association with the user information transmitted by the information transmitting section.

BRIEF DESCRIPTION OF THE DRAWINGS

FIG. 7 illustrates an example of image forming apparatus managing information indicated in FIG. 5.

DETAILED DESCRIPTION

First and second embodiments of the present disclosure will be described below with reference to the accompanying drawings.

First Embodiment

A configuration of a printing system according to the present embodiment will be described first.

Figure 1:
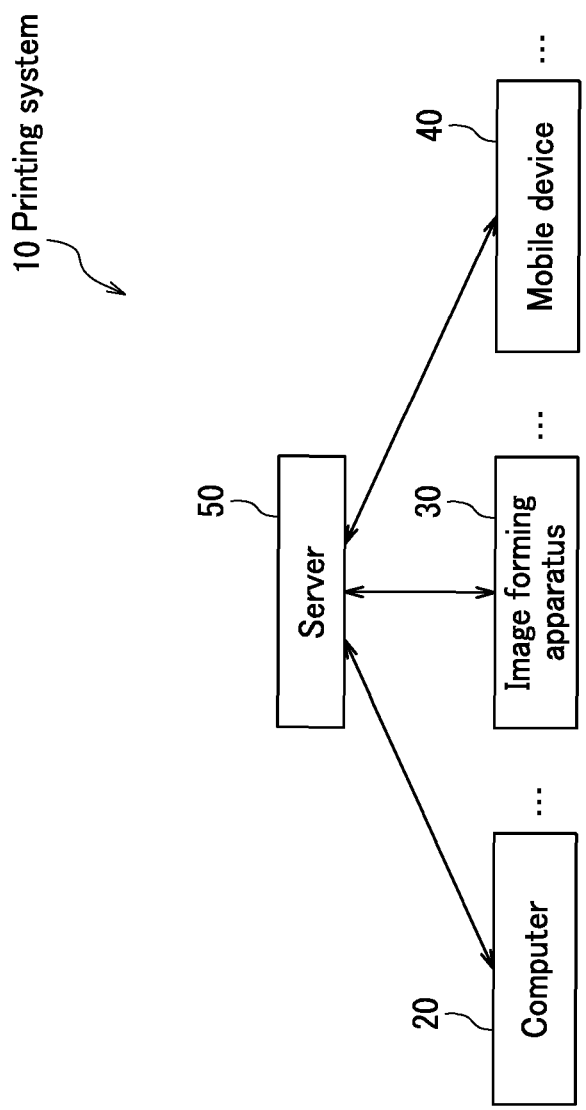
FIG. 1 is a block diagram illustrating a printing system according to a first embodiment of the present disclosure.

FIG. 1 is a block diagram of a printing system 10 according to the present embodiment.

As illustrated in FIG. 1, the printing system 10 includes a computer 20, multiple computers similar to the computer 20, an image forming apparatus 30, multiple image forming apparatuses similar to the image forming apparatus 30, a mobile device 40 that a user carries, multiple mobile devices similar to the mobile device 40, and a server 50. The computer 20 is a personal computer (PC), or the like that generates print data. The image forming apparatus 30 executes a print job based on the print data. The mobile device 40 may be a smartphone or a tablet computer, for example.

The computer 20 will be described below as a representative of all the computers included in the printing system 10. Similarly, the image forming apparatus 30 will be described below as a representative of all the image forming apparatuses included in the printing system 10. Further, the mobile device 40 will be described below as a representative of all the mobile devices included in the printing system 10.

The computer 20 is connectable with the server 50 via a network such as a local area network (LAN) or Internet. Similarly, the image forming apparatus 30 is connectable with the server 50 via a network such as a LAN or Internet. Further, the mobile device 40 is connectable with the server 50 via a network such as a LAN or Internet.

The image forming apparatus 30 may be a multifunction peripheral (MFP) or a printer, for example.

The server 50 is constituted by one or more computers such as PCs.

Figure 2:
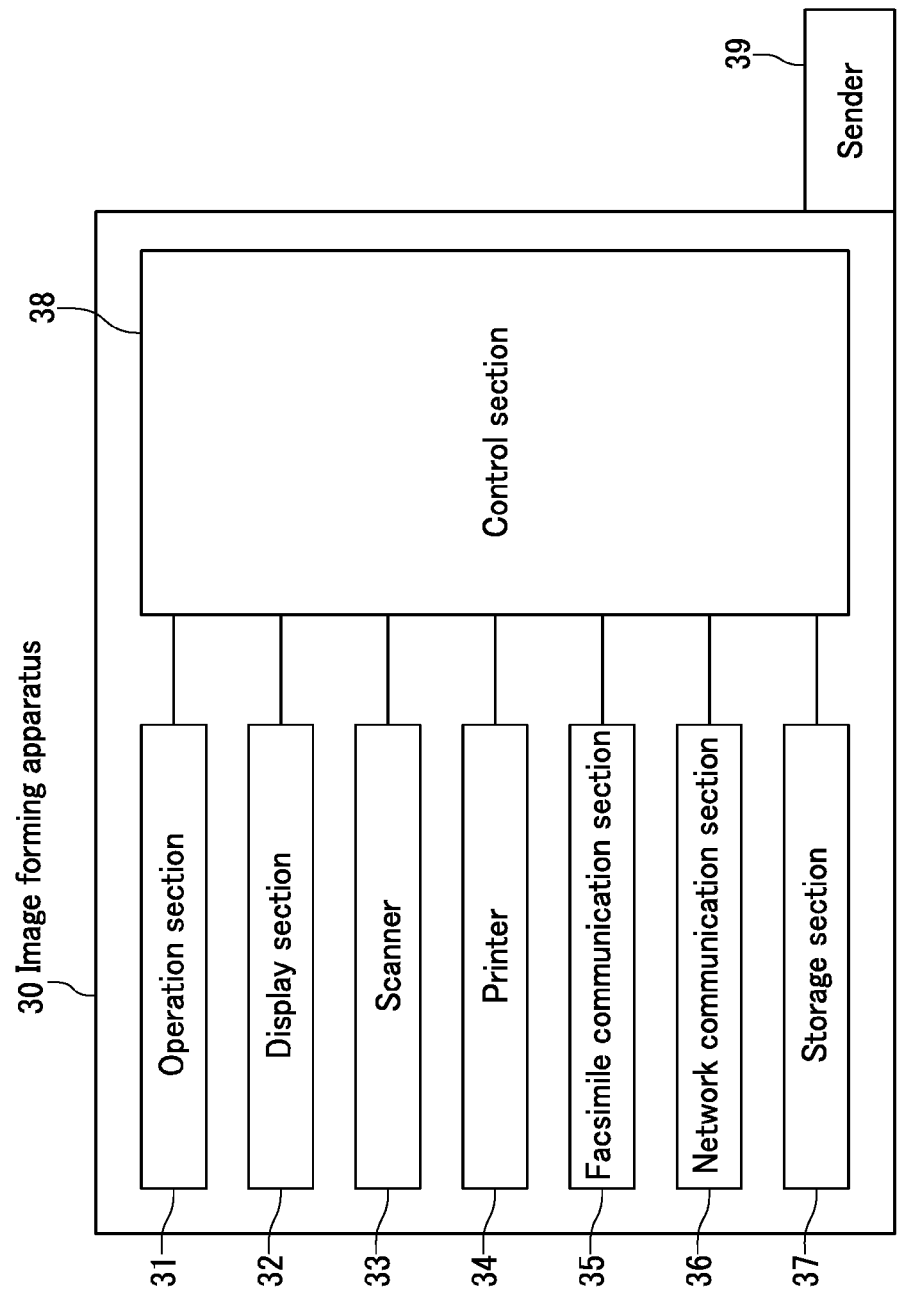
FIG. 2 is a block diagram illustrating an image forming apparatus indicated in FIG. 1.

FIG. 2 is a block diagram of the image forming apparatus 30.

As illustrated in FIG. 2, the image forming apparatus 30 includes an operation section 31, a display section 32, a scanner 33, a printer 34, a facsimile communication section 35, a network communication section 36, a storage section 37, and a control section 38. The operation section 31 is an input device to which various types of user operations are input, such as a button. The display section 32 is a display device that displays various information, such as a liquid crystal display (LCD). The scanner 33 is a scanning device that scans image data from an original document. The printer 34 is a printing device that performs printing on a recording medium such as a sheet of paper. The facsimile communication section 35 is a facsimile device that performs facsimile communication with an external facsimile machine (not illustrated) via a communication line such as a telephone line. The network communication section 36 is a network communication device that performs communication with an external device via a network. The storage section 37 is a storage device that stores therein various types of data, such as an electrically erasable programmable read only memory (EEPROM) or a hard disk drive (HDD). The control section 38 controls entire operation of the image forming apparatus 30.

The image forming apparatus 30 further includes a sender 39 that operates independently of the image forming apparatus 30. The sender 39 is mounted on the image forming apparatus 30. The sender 39 constitutes an identification information sending section that sends identification information of the sender 39 (hereinafter referred to as tag information) via radio waves.

The control section 38 includes for example a central processing unit (CPU), a read only memory (ROM) that stores therein programs and various types of data, and a random access memory (RAM) that is used as a work area of the CPU. The CPU executes programs stored in the ROM or the storage section 37.

Figure 3:
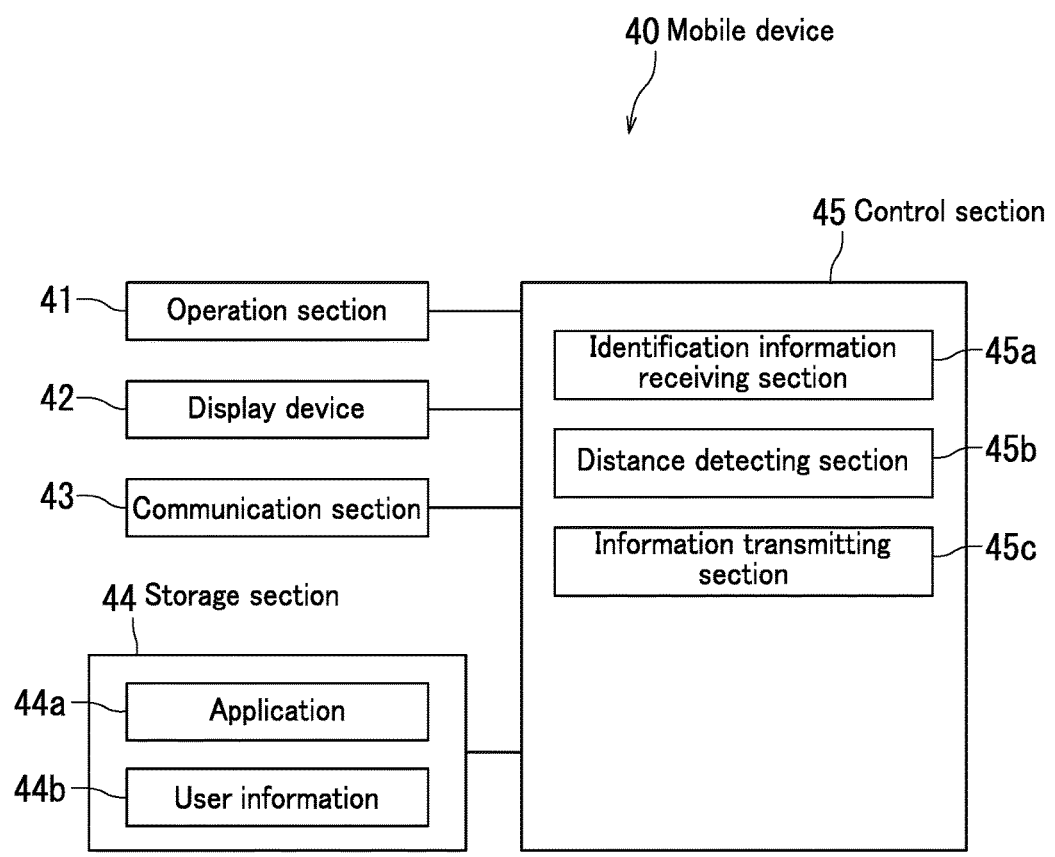
FIG. 3 is a block diagram illustrating a mobile device indicated in FIG. 1.

FIG. 3 is a block diagram illustrating the mobile device 40.

As illustrated in FIG. 3, the mobile device 40 includes an operation section 41, a display section 42, a communication section 43, a storage section 44, and a control section 45. The operation section 41 is an input device to which various types of operations are input, such as a button. The display section 42 is a display device that displays various information, such as a LCD. The communication section 43 is a communication device that performs communication with an external device. The storage section 44 is a storage device that stores therein various types of data, such as an EEPROM or a HDD. The control section 45 controls entire operation of the mobile device 40.

The storage section 44 stores an application 44a therein. The application 44a may be installed into the mobile device 40 at manufacture of the mobile device 40. Alternatively, the application 44a may be installed into the mobile device 40 additionally from a storage medium such as a secure digital (SD) card or a universal serial bus (USB) memory. Or, the application 44a may be installed into the mobile device 40 via a network. The application 44a is for causing the image forming apparatus 30 (see FIG. 1) to execute a print job based on print data managed by the server 50 (see FIG. 1).

The storage section 44 is capable of storing therein user information 44b of a user carrying the mobile device 40.

The control section 45 includes for example a CPU, a ROM that stores therein programs and various types of data, and a RAM that is used as a work area of the CPU. The CPU executes programs stored in the ROM or the storage section 44.

The control section 45 executes the application 44a stored in the storage section 44 to function as an identification information receiving section 45a, a distance detecting section 45b, and an information transmitting section 45c. The identification information receiving section 45a receives via the communication section 43 tag information sent via radio waves by the sender 39 (see FIG. 2) of the image forming apparatus 30. The distance detecting section 45b detects an inter-device distance between the mobile device 40 and the image forming apparatus 30 according to the intensity of the radio waves sent by the sender 39. The information transmitting section 45c transmits the user information 44b on the storage section 44 to the server 50.

The information transmitting section 45c transmits to the server 50 the tag information received by the identification information receiving section 45a and the inter-device distance detected by the distance detecting section 45b in association with the user information 44b.

Figure 4:
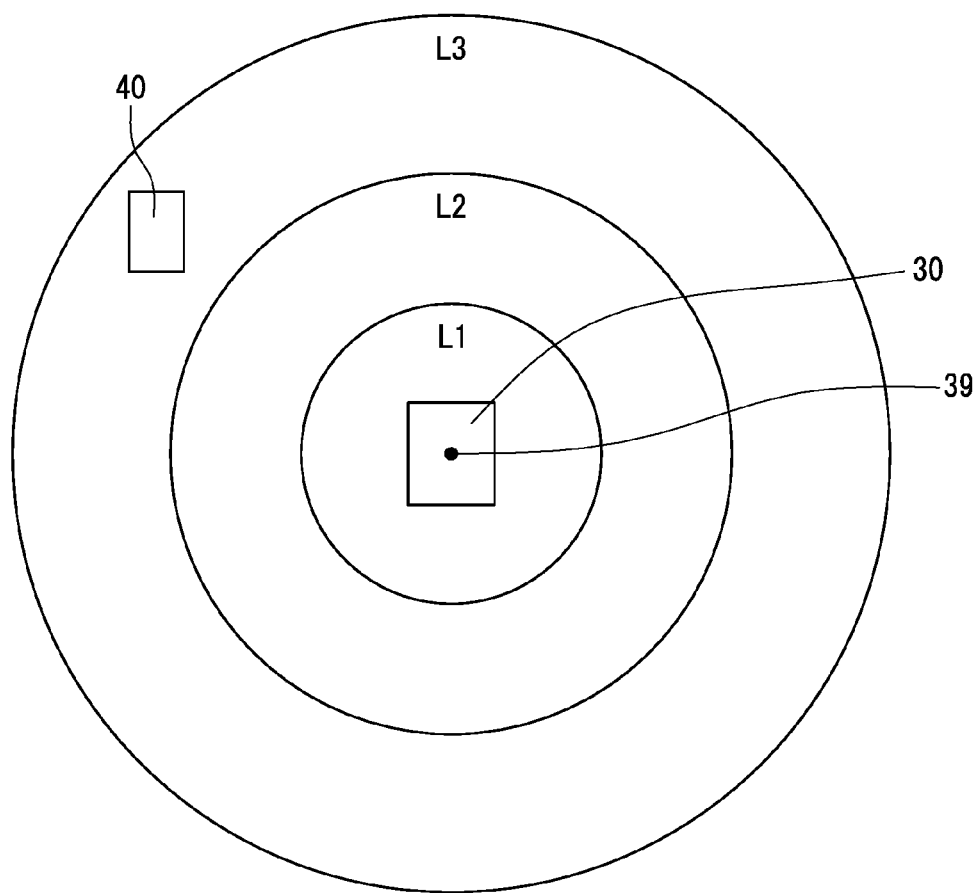
FIG. 4 illustrates an example of an inter-device distance detected by the mobile device indicated in FIG. 3.

FIG. 4 illustrates an example of an inter-device distance detected by the mobile device 40.

As illustrated in FIG. 4, the distance detecting section 45b (see FIG. 3) of the mobile device 40 detects the inter-device distance between the mobile device 40 and the image forming apparatus 30 relative to the position of the sender 39 as a center according to the intensity of the radio waves sent by the sender 39 of the image forming apparatus 30. For example, the distance detecting section 45b is capable of detecting as an inter-distance a distance L1 ranging from at least 0 m to less than 10 m, a distance L2 ranging from at least 10 m to less than 20 m, and a distance L3 ranging from at least 20 m to less than 30 m. The radio waves sent by the sender 39 is too weak at a location 30 m or more distant from the sender 39. Therefore, the communication section 43 cannot receive the radio waves sent by the sender 39.

Figure 5:
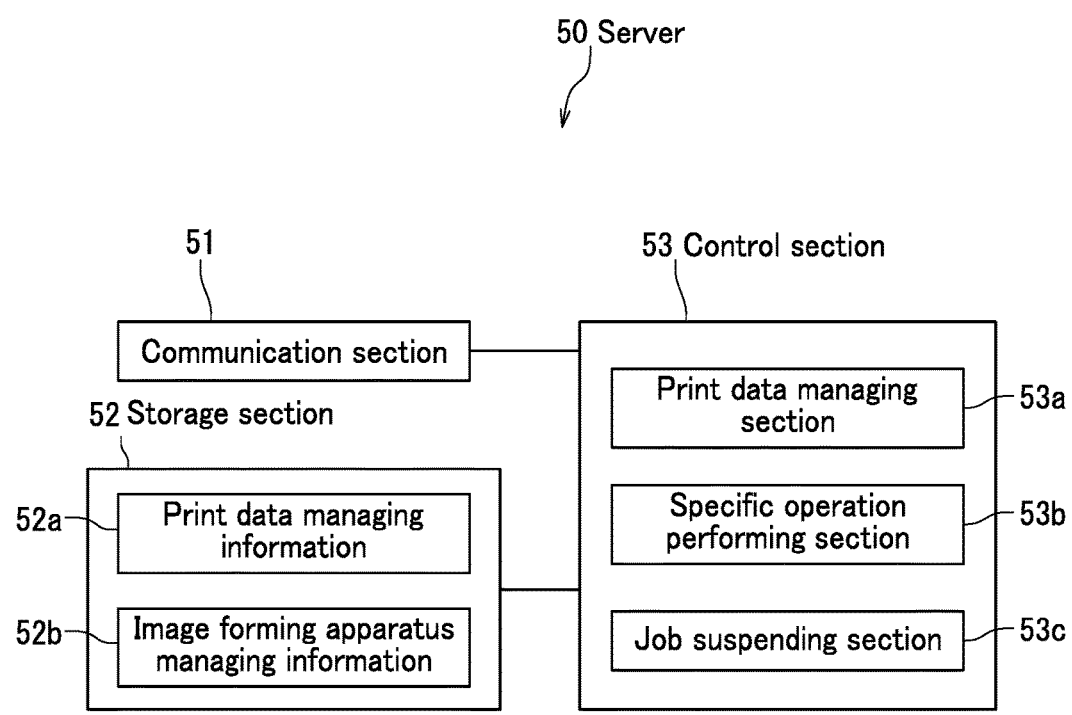
FIG. 5 is a block diagram of a server indicated in FIG. 1.

FIG. 5 is a block diagram of the server 50.

As illustrated in FIG. 5, the server 50 includes a communication section 51, a storage section 52, and a control section 53. The communication section 51 is a communication device that performs communication with an external device. The storage section 52 is a storage device that stores various types of data therein, such as a HDD. The control section 53 controls entire operation of the server 50.

The storage section 52 is capable of storing therein print data managing information 52a for managing print data.

Figure 6:
FIG. 6 indicates an example of print data managing information indicated in FIG. 5.

FIG. 6 indicates an example of the print data managing information 52a.

As illustrated in FIG. 6, the print data managing information 52a contains user information, print data, inter-device distances, and Internet Protocol (IP) addresses or host names of the image forming apparatuses that each are a transmission target of corresponding print data. The print data is associated with corresponding user information. The inter-device distances each are a distance between a mobile device that is a transmission source of corresponding user information and an image forming apparatus that is a transmission target of corresponding print data. For example, the server 50 manages print data of a plurality of users in the print data managing information 52a indicated in FIG. 6. The users include a user identified by user information "USER001", a user identified by user information "USER002", etc. The server 50 further manages plural pieces of print data "DATA239", "DATA432", etc., for example, as print data of the user identified by the user information "USER001". The server 50 further manages a plurality of image forming apparatuses "MFP135", "MFP587", etc., for example, that are transmission targets of the print data "DATA239". The server 50 additionally manages, for example, a distance "L2" as an inter-device distance between a mobile device that is a transmission source of the user information "USER001" and the image forming apparatus "MFP135" that is a transmission target of the user information "USER001". That is, the server 50 manages the distance "L2" as the inter-device distance between the mobile device carried by the user identified by the user information "USER001" and the image forming apparatus "MFP135".

As illustrated in FIG. 5, the storage section 52 is capable of storing therein the image forming apparatus managing information 52b for managing the image forming apparatuses.

FIG. 7 illustrates an example of the image forming apparatus managing information 52b.

As illustrated in FIG. 7, the image forming apparatus managing information 52b contains tag information that is sent via radio waves by the sender 39 of each image forming apparatus and an IP address or a host name of the image forming apparatus associated with the tag information.

The control section 53 indicated in FIG. 5 includes a CPU, a ROM that stores therein programs and various types of data, and a RAM that is used as a work area of the CPU, for example. The CPU executes programs stored in the ROM or the storage section 52.

The control section 53 executes programs stored in the ROM or the storage section 52 to function as a print data managing section 53a, a specific operation performing section 53b, and a job suspending section 53c. The print data managing section 53a manages print data in association with the user information. The specific operation performing section 53b performs a specific operation for causing the image forming apparatus 30 to execute a print job based on print data managed by the print data managing section 53a (hereinafter referred to as a specific operation for job execution). The job suspending section 53c causes an image forming apparatus to suspend execution of a print job retained in the image forming apparatus.

Operation of the printing system 10 will be described next.

Description will be given first about operation of the computer 20 for transmitting print data to the server 50.

In response to a user instructing transmission of print data to the server 50, the computer 20 transmits the user information of the user and the print data associated with the user information.

The print data managing section 53a of the server 50 incorporates into the print data managing information 52a the print data and the user information associated with the print data that have been transmitted from the computer 20.

Description will be made next about operation of the mobile device 40 for transmitting the user information to the server 50.

Figure 8:
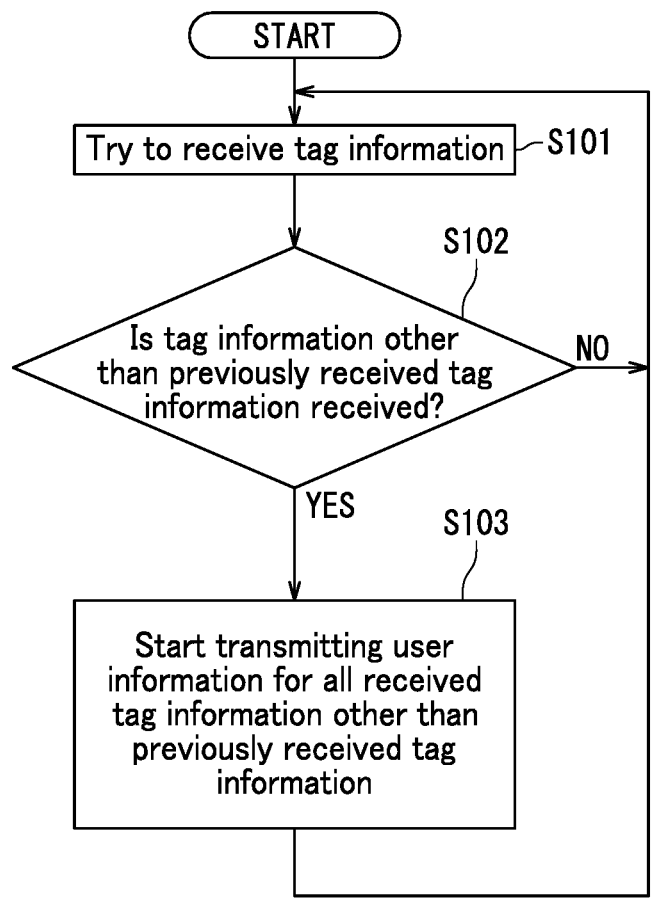
FIG. 8 is a flowchart depicting operation of the mobile device indicated in FIG. 3 for receiving tag information sent via radio waves by a sender.

FIG. 8 is a flowchart depicting operation of the mobile device 40 for receiving tag information sent via radio waves by the sender 39.

As depicted in FIG. 8, the identification information receiving section 45a of the mobile device 40 tries to receive via the communication section 43 tag information send via radio waves by the sender 39 of the image forming apparatus 30 (S101).

The identification information receiving section 45a then determines whether or not tag information other than tag information that has been received in the previous processing at S101 is received in the current processing at S101 (S102).

When determining at S102 that any tag information other than the tag information that has been received in the previous processing at S101 is not received in the current processing at S101, the identification information receiving section 45a repeats the processing at S101.

When determining at S102 that tag information other than the tag information that has been received in the previous processing at S101 is received in the current processing at S101, the identification information receiving section 45a performs processing at S103. Specifically, the identification information receiving section 45a causes the information transmitting section 45c to start user information transmission depicted in FIG. 8 for each of the tag information received in the current processing at S101 other than the tag information that has been received in the previous processing at S101 (S103). Then, the identification information receiving section 45a repeats the processing at S101.

Figure 9:
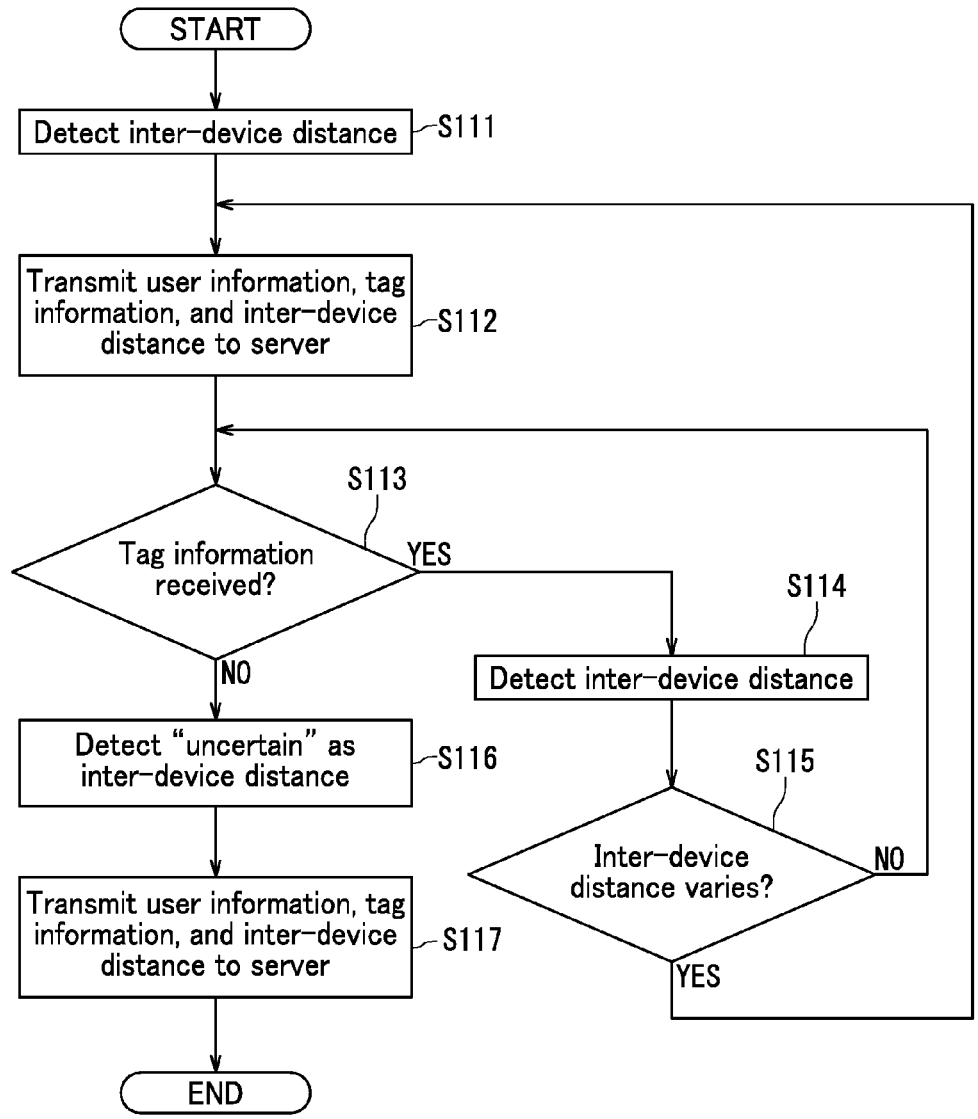
FIG. 9 is a flowchart depicting operation of the mobile device indicated in FIG. 3 for transmitting user information to the server.

FIG. 9 is a flowchart depicting operation of the mobile device 40 for transmitting the user information to the server 50. Target tag information in the operation depicted in FIG. 9 will be hereinafter referred to as target tag information.

As depicted in FIG. 9, the distance detecting section 45b of the mobile device 40 detects any one of the distances L1-L3 as an inter-device distance according to the intensity of the radio waves received in the processing at S101 in FIG. 8 (S111).

The information transmitting section 45c then transmits to the server 50 the user information 44b on the storage section 44, the target tag information, and the inter-device distance detected at S111 in association with one another (S112).

The print data managing section 53a of the server 50 incorporates into the print data managing information 52a, a combination of the user information, the target tag information, and the inter-device distance that are transmitted from the mobile device 40. In a situation in which print data not associated with an IP address or a host name of any image forming apparatus is present in the image forming apparatus managing information 52b among the print data associated with the user information transmitted from the mobile device 40, the print data managing section 53a associates with the print data, the IP address or the host name associated with the tag information combined with the user information associated with the print data in the image forming apparatus managing information 52b. In a situation in which an inter-device distance associated with both print data associated with the user information transmitted from the mobile device 40 and an IP address or a host name of the image forming apparatus associated with tag information transmitted in association with the user information from the mobile device 40 in the image forming apparatus managing information 52b is already present in the print data managing information 52a, the print data managing section 53a overwrites the inter-device distance with a new inter-device distance transmitted from the mobile device 40 in association with the user information.

After the processing at S112, the distance detecting section 45b determines whether or not the target tag information is received in the most recent processing at S101 depicted in FIG. 8 (S113).

When it is determined at S113 that the target tag information is received, the distance detecting section 45b detects any of the distances L1-L3 as an inter-device distance for the target tag information according to the intensity of the radio waves received in the processing at S101 depicted in FIG. 8 (S114).

The distance detecting section 45b then determines whether or not the previously detected inter-device distance has varied to the inter-device distance detected in the current processing at S114 (S115). In a situation in which the current processing at S114 is first-time processing at S114 after initiation of the operation depicted in FIG. 9, the previously detected inter-device distance is an inter-device distance detected in the processing at S111. In a situation in which the current processing at S114 is second- or following-time processing at S114 after initiation of the operation depicted in FIG. 9, the previously detected inter-device distance is an inter-device distance detected in the previous processing at S114.

When detecting the distance L2 as an inter-device distance in the current processing at S114 in a situation for example in which the previously detected inter-device distance is the distance L3 and the user approaches the image forming apparatus 30 while carrying the mobile device 40, the distance detecting section 45b determines that the inter-device distance varies. As well, when detecting the distance L2 as an inter-device distance in the current processing at S114 in a situation in which the previously detected inter-device distance is the distance L1 and the user moves away from the image forming apparatus 30 while carrying the mobile device 40, the distance detecting section 45b determines that the inter-device distance varies.

When it is determined at S115 that the inter-device distance does not varied, the distance detecting section 45b repeats the processing at S113.

By contrast, when it is determined at S115 that the inter-device distance varies, the information transmitting section 45c repeats the processing at S112.

When it is determined at S113 that no target tag information is received, the distance detecting section 45b detects "uncertain distance" as an inter-device distance (S116).

The information transmitting section 45c then transmits to the server 50 the user information 44b on the storage section 44, the target tag information, and the inter-device distance detected at S116 in association with one another (S117).

When the user information, the target tag information, and the inter-device distance are transmitted from the mobile device 40, the print data managing section 53a of the server 50 incorporates a combination of the transmitted user information, the target tag information, and the inter-device distance into the print data managing information 52a, as described above.

When the processing at S117 ends, the information transmitting section 45c terminates the operation depicted in FIG. 9.

A description will be made next about operation of the server 50 for performing the specific operation for job execution.

Figure 10:
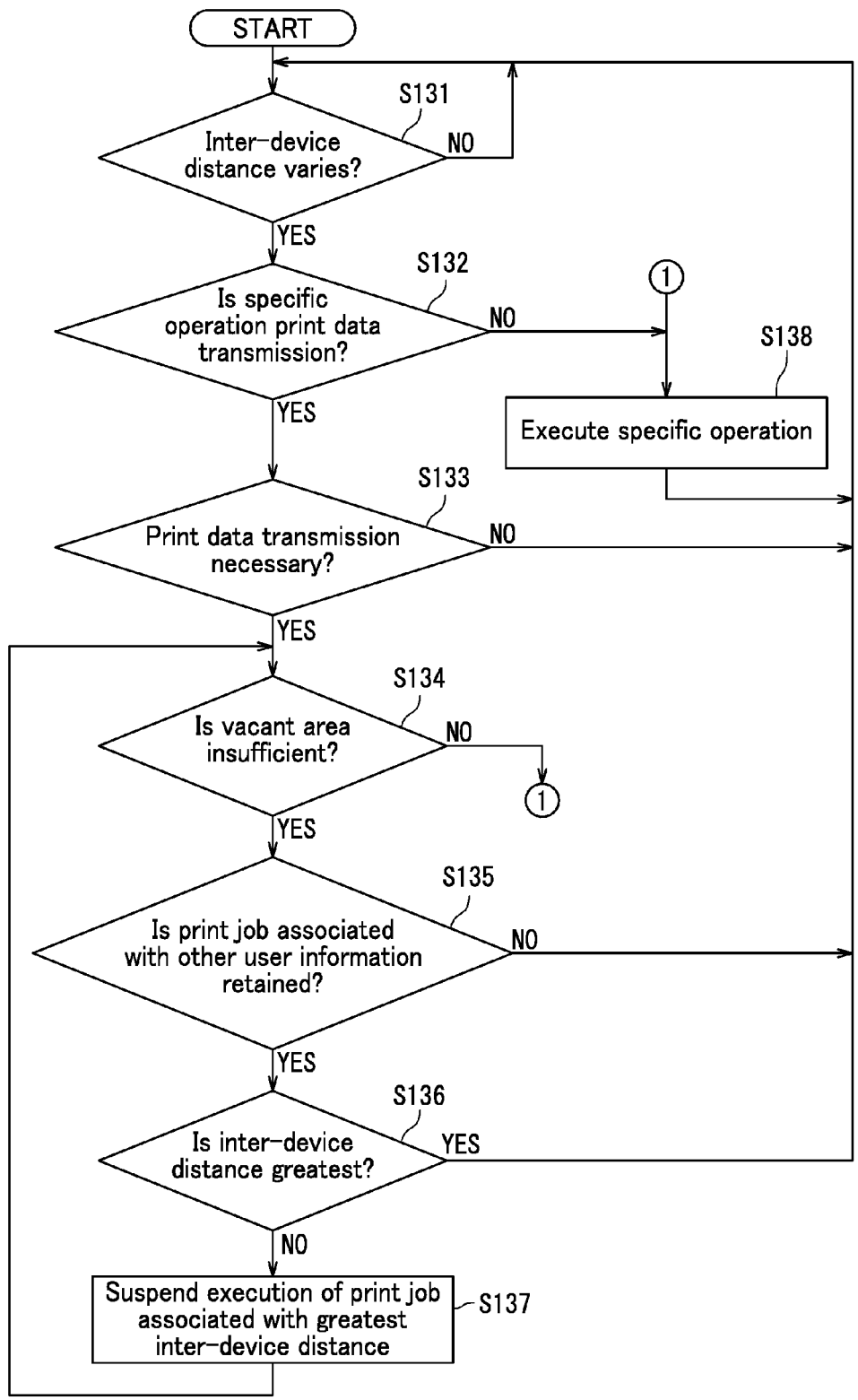
FIG. 10 is a flowchart depicting operation of the server indicated in FIG. 5 for executing a job execution specific operation.

FIG. 10 is a flowchart depicting the operation of the server 50 for performing the specific operation for job execution.

The control section 53 of the server 50 performs the operation depicted in FIG. 10 for each combination of the user information and the image forming apparatuses (IP addresses or host names) in the print data managing information 52a.

As depicted in FIG. 10, the specific operation performing section 53b of the server 50 continues determining whether or not an inter-device distance associated in a target combination in the print data managing information 52a varies until the inter-device distance associated in the target combination in the print data managing information 52a varies (S131).

When it is determined at S131 that the inter-device distance associated in the target combination varies in the print data managing information 52a, the job suspending section 53c determines whether or not the specific operation for job execution set for the new inter-device distance is transmission of print data (S132).

Operation to return a target image forming apparatus from a sleep state is set as a specific operation for job execution relating to the distance L3, for example. As a specific operation for job execution relating to the distance L2, for example, an operation is set to cause, via transmission of print data and target user information that are associated with each other in a target combination in the print data managing information 52a to a target image forming apparatus, the target image forming apparatus to retain a print job based on the print data in association with the target user information in a standby state. As a specific operation for job execution relating to the distance L1, for example, operation is set to cause, via causing a target image forming apparatus to render as a print job print data that is already retained in the image forming apparatus in association with target user information in a target combination in the print data managing information 52a, to cause the target image forming apparatus to retain the print job based on the rendered print data in association with the target user information in a standby state.

In a situation in which the specific operation for job execution set for a new inter-device distance is transmission of print data, the new inter-device distance is accordingly the distance L2.

When it is determined at S132 that the specific operation for job execution set according to the new inter-device distance is transmission of print data, the job suspending section 53c determines whether or not to transmit the print data associated in the target combination in the print data managing information 52a to the target image forming apparatus (S133). In a situation in which a print job based on print data is already retained in the image forming apparatus, the job suspending section 53c determines not to transmit the print data to the image forming apparatus.

When it is determined at S133 that the print data associated in the target combination in the print data managing information 52a is to be transmitted to the target image forming apparatus, the job suspending section 53c determines whether or not a vacant area of the RAM of the target image forming apparatus is insufficient if the print data is transmitted to the target image forming apparatus (S134). In a configuration in which the server 50 always monitors the vacant area of the RAM of the image forming apparatus, the job suspending section 53c can determine based on a result of monitoring whether or not the vacant area of the RAM of the target image forming apparatus is insufficient. Alternatively, the job suspending section 53c may determine that the vacant area of the RAM of the target image forming apparatus is insufficient in a situation in which the specific operation performing section 53b actually transmits the print data associated in the target combination in the print data managing information 52a to the target image forming apparatus and the transmission is failed.

Figure 11:
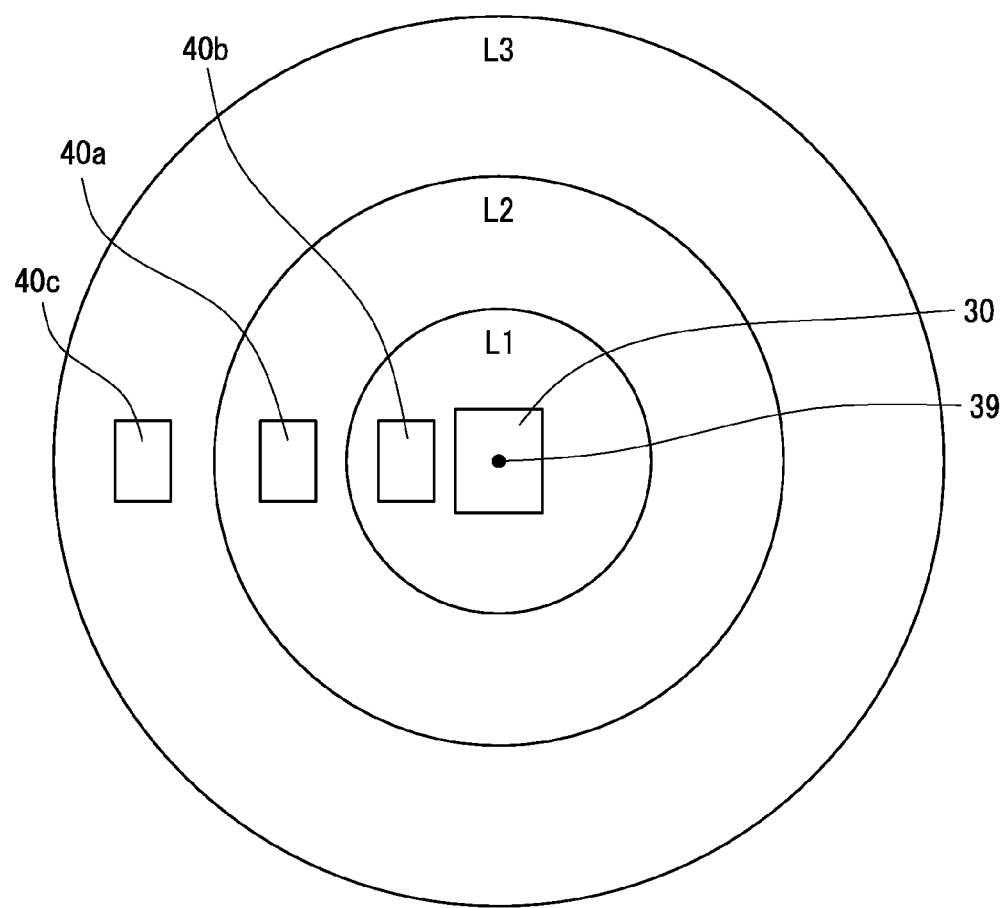
FIG. 11 illustrates an example of the inter-device distance illustrated in FIG. 4 in a situation in which a plurality of mobile devices are present around the image forming apparatus.

When it is determined at S134 that the vacant area of the RAM of the target image forming apparatus is insufficient, the job suspending section 53c determines whether or not the target image forming apparatus already retains a print job based on print data associated with user information other than the target user information (S135). For example, as illustrated in FIG. 11, in a situation in which any mobile device e.g., mobile device(s) 40b and/or 40c) that stores user information other than the target user information is present other than the mobile device (e.g., mobile device 40a) that stores the target user information within the distances L1-L3 around the target image forming apparatus (e.g., image forming apparatus 30), the target image forming apparatus may already retain a print job based on print data associated with the user information other than the target user information.

As depicted in FIG. 10, when it is determined at S135 that the target image forming apparatus already retains a print job based on print data associated with user information other than the target user information, the job suspending section 53c determines whether or not the inter-device distance associated with the print data associated in the target combination in the print data managing information 52a is at least one of the greatest inter-device distances among the inter-device distance associated with the print data in the print data managing information 52a on which the print job already retained in the target image forming apparatus is based and the inter-device distance associated with the print data associated in the target combination in the print data managing information 52a (S136).

When it is determined at S136 that the inter-device distance is not at least one of the greatest inter-device distances, the job suspending section 53c causes the target image forming apparatus to suspend execution of any one of the print jobs of the print data associated with the greatest inter-device distances in the print data managing information 52a among the print jobs already retained in the target image funning apparatus (S137). That is, the job suspending section 53c deletes the print job from the target image forming apparatus together with the print data on which the print job is based. The job suspending section 53c also causes the print data managing section 53a to delete the IP address or the host name of the target image forming apparatus among data associated with the print data in the print data managing information 52a.

The job suspending section 53c executes the processing at S137 and then the processing at S134.

When it is determined at S132 that the specific operation for job execution set according to the new inter-device distance is not transmission of the print data or it is determined at S134 that a vacant area of the RAM in the target image forming apparatus is not insufficient, the specific operation performing section 53b performs the specific operation for job execution set according to the new inter-device distance on the target image forming apparatus (S138) and then performs the processing at S131.

For example, in a situation in which the inter-device distance associated in the target combination in the print data managing information 52a varies from "uncertain" to the distance L3, the specific operation performing section 53b performs returning of the target image forming apparatus from the sleep state as the specific operation for job execution. However, in a situation in which the image forming apparatus is already not in the sleep state before execution of the specific operation for job execution, the specific operation performing section 53b does not perform the specific operation for job execution.

In a situation for example in which the inter-device distance associated in the target combination in the print data managing information 52a varies for example from the distance L3 to the distance L2, the specific operation performing section 53b causes, via transmission of print data and the target user information associated in the target combination in the print data managing information 52a to the target image forming apparatus as the specific operation for job execution, the image forming apparatus to retain a print job based on the print data association with the user information in the standby state. However, in a situation in which the image forming apparatus already retains a print job based on print data in association with the user information before execution of the specific operation for job execution, the specific operation performing section 53b does not perform the specific operation for job execution.

In a situation in which the inter-device distance associated in the target combination in the print data managing information 52a varies for example from the distance L2 to the distance L1, the specific operation performing section 53b performs as the specific operation for job execution, via causing the image forming apparatus to render as a print job the print data already retained in the target image forming apparatus in association with the target user information in the target combination in the print data managing information 52a, causing the image forming apparatus to retain a print job based on the rendered print data associated with the user information in a standby state. By contrast, in a situation in which the image forming apparatus already retains the print job based on the rendered print data in association with the user information before execution of the specific operation for job execution, the specific operation performing section 53b does not perform the specific operation for job execution.

In the above configuration, when a user who carries the mobile device 40 logs on to the image forming apparatus 30 using user's own user information via the operation section 31 of the image forming apparatus 30 and then instructs via the operation section 31, the image forming apparatus 30 to execute a print job retained in association with the user information in a standby state, the image forming apparatus 30 in the standby state can be caused to execute the print job retained in association with the user information. When the print job is complete, the image forming apparatus 30 notifies the server 50 which print job execution is complete. The print data managing section 53a of the server 50 accordingly deletes the IP address or the host name of the image forming apparatus associated with the print data of the print job of which execution completion is notified from the image forming apparatus among data contained in the print data managing information 52a.

When one of determination at S133 that the print data associated in the target combination in the print data managing information 52a is not to be transmitted to the target image forming apparatus, determination at S135 that the target image forming apparatus does not retain a print job based on print data associated with user information other than the target user information, and determination at S136 that the inter-device distance associated with the print data associated in the combination in the print data managing information 52a is at least one of the greatest inter-device distances is made, the specific operation performing section 53b performs the processing at S131 without performing the specific operation for job execution (S138).

As described above, in the printing system 10, in a situation in which the server 50 suspends execution of a print job based on print data managed in the server 50 by the image forming apparatus 30 (S137), the server 50 operates based on an inter-device distance according to the intensity of the radio waves sent by the sender 39 included in the image forming apparatus 30. That is, the server 50 operates not based on the position information of the mobile device 40 obtained via the GPS function. The above configuration can reduce processing loads on the mobile device 40 and the server 50 and a load in communication between the mobile device 40 and the server 50. As a result, a load in a situation in which the image forming apparatus 30 executes a print job based on print data managed by in the server 50 can be reduced in the printing system 10.

In a situation in which the server 50 executes the specific operation for job execution (S138), for example, in a situation in which the server 50 causes the image forming apparatus 30 to retain a print job based on print data managed by the server 50, the printing system 10 operates based on an inter-device distance according to the intensity of the radio waves sent by the sender 39 included in the image forming apparatus 30. That is, the server 50 operates not based on the position information of the mobile device 40 obtained via the GPS function. The above configuration can reduce processing loads on the mobile device 40 and the server 50 and a load in communication between the mobile device 40 and the server 50. As a result, a load in a situation in which the image forming apparatus 30 executes a print job based on print data managed by the server 50 can be reduced in the printing system 10.

The printing system 10 suspends execution of print jobs in descending order of inter-device distances (S134-S137). In the above configuration, a print job of print data associated with user information in a mobile device present in the vicinity of an image forming apparatus can be left in the image forming apparatus with priority. Thus, user friendliness in execution of a print job can be increased in the printing system 10.

When a mobile device having user information associated with print data on which a new print job is based is located the farthest from the image forming apparatus (Yes at S136) in a situation in which the image forming apparatus is incapable of retaining an additional print job due to the absence of a sufficient vacant area of the storage region (Yes at S134), the printing system 10 does not perform transmission of the print data on which the new print job is based to the image forming apparatus (S138). The above configuration can reduce processing loads on the server 50 and the image forming apparatus and a load in communication between the server 50 and the image forming apparatus.

The server 50 executes the specific operation for job execution according to an inter-device distance in a stepwise manner in the printing system 10. In the above configuration, the printing system 10 can cause the server 50 and the image forming apparatus 30 to perform appropriate processing according to the inter-device distance.

The server 50 may execute the specific operation for job execution not in the stepwise manner according to an inter-device distance. For example, when the mobile device 40 receives tag information sent via radio waves by the sender 39 included in the image forming apparatus 30, the server 50 returns the image forming apparatus 30 from the sleep state. The server 50 then transmits to the image forming apparatus 30, user information transmitted from the mobile device 40 and print data managed in the print data managing information 52*a* in association with the user information together with the tag information. The server 50 may perform a series of operation to cause the image forming apparatus 30 to render print data and then allow the image forming apparatus 30 to retain a print job based on the print rendered data in association with the user information in the standby state.

The printing system 10 returns the image forming apparatus 30 from the sleep state according to an inter-device distance for execution of a print job based on print data managed by the server 50. In the above configuration, the image forming apparatus 30 can execute the print job early.

The printing system 10 transmits print data managed by the server 50 to the image forming apparatus 30 according to an inter-device distance. In the above configuration, the image forming apparatus 30 can start execution of a print job based on print data early.

The printing system 10 causes the image forming apparatus 30 to render a print job based on print data managed by the server 50 according to an inter-device distance. In the above configuration, the image forming apparatus 30 can terminate execution the print job based on the print data early.

The server 50 may execute as the specific operation for job execution, the above operation according to an inter-device distance different from the above example inter-device distance. The distance L2 in the above example is a job retention distance range within which a print job is retained. Alternatively, the distance L1 or L3 may be the job retention distance range.

The server 50 may perform operation other than the above operation as the specific operation for job execution.

For example, in a situation in which an inter-device distance associated in a target combination in the print data managing information 52*a* varies from the distance L2 to the distance L1, the specific operation performing section 53*b* of the server 50 may perform as the specific operation for job execution, operation for causing the target image forming apparatus to execute a print job that is based on the print data associated in the target combination in the print data managing information 52*a* and that is already retained in the target image forming apparatus in association with the target user information. In the above configuration, the image forming apparatus 30 executes a print job based on print data managed by the server 50 according to an inter-device distance in the printing system 10. In the above configuration, the image forming apparatus 30 can complete execution of the print job early in the printing system 10.

A specific operation for job execution and an inter-device distance according to which the specific operation for job execution is executed may be set in the server 50 or the application 44*a* in the mobile device 40 in the printing system 10. In a situation in which a given specific operation for job execution according to a given inter-device distance is set in the application 44*a* in the mobile device 40, the information transmitting section 45*c* of the mobile device 40 may transmit to the server 50 the content of the specific operation for job execution to be executed by the server 50 when the user information 44*b*, the tag information, and the inter-device distance are transmitted.

In the above configuration, the server 50 transmits print data to an image forming apparatus when an inter-device distance falls in the job retention distance range, thereby causing the image forming apparatus to retain a print job based on the print data. In other words, the specific operation performing section 53*b* of the server 50 serves a job retention instructing section. Alternatively, the server 50 may cause an image forming apparatus to retain a print job based on print data, for example, via transmission of the print data to the image forming apparatus in accordance with a user instruction via the operation section 41 of the mobile device 40 regardless of the inter-device distance.

The printing system 10 directly detects an inter-device distance according to the intensity of the radio wave sent by the sender 39 included in the image forming apparatus 30. That is, the printing system 10 detects an inter-device distance not indirectly via calculation of the inter-device distance based on the position information of the mobile device 40 obtained via the GPS function. Thus, accuracy in detection of an inter-device distance can be increased in the printing system 10.

The image forming apparatuses in the printing system 10 each include the sender that operates independently of the image forming apparatus. Accordingly, even a low-cost image forming apparatus incapable of sending tag information via radio waves is enabled to send tag information via radio waves by mounting a sender capable of sending tag information via radio waves to the image forming apparatus.

An image forming apparatus capable of sending tag information via radio waves needs not to be provided with a sender that operates independently of the image forming apparatus.

Second Embodiment

Figure 12:
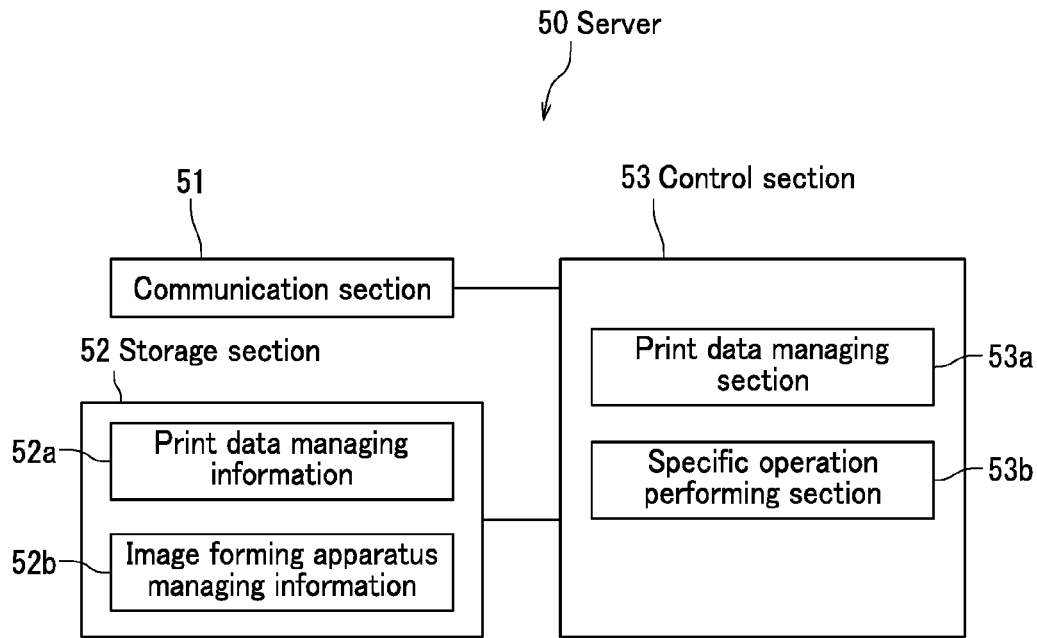
FIG. 12 is a block diagram of a server according to a second embodiment of the present disclosure.
Figure 13:
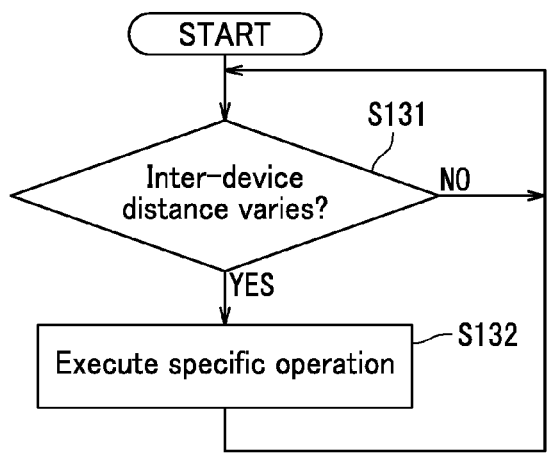
FIG. 13 is a flowchart depicting operation of the server indicated in FIG. 12.

A printing system 10 according to a second embodiment will be described next with reference to FIGS. 12 and 13. FIG. 12 is a block diagram of a server 50 according to the second embodiment of the present disclosure. FIG. 13 is a flowchart depicting operation of the server 50 according to the second embodiment. Matter different from that in the first embodiment will be focused on in the second embodiment. As indicated in FIG. 12, a control section 53 of the server 50 included in the printing system 10 functions as a print data managing section 53a and a specific operation performing section 53b rather than the control section 53 described in the first embodiment.

When it is determined at S131 that an inter-device distance associated in a target combination in the print data managing information 52a varies, the specific operation performing section 53b executes a specific operation for job execution set according to the new inter-device distance on a target image forming apparatus (S13), and executes the processing at S131.

As described above, in the printing system 10, the server 50 executes the specific operation for job execution (S132) based on tag information that is send by the sender 39 included in the image forming apparatus 30 and that is received by the mobile device 40. That is, the printing system 10 operates not based on the position information of the mobile device 40 obtained via the GPS function. The above configuration can reduce processing loads on the mobile device 40 and the server 50 and a load in communication between the mobile device 40 and the server 50. This results in reduction in a load in a situation in which the image forming apparatus 30 executes a print job based on print data managed by the server 50 in the printing system 10.

What is claimed is:

1. A printing system comprising:
    an image forming apparatus including an identification information sending section configured to send identification information via radio waves;
    a server including a print data managing section configured to manage print data in association with user information; and
    a mobile device including an identification information receiving section configured to receive the identification information sent via radio waves by the identification information sending section, wherein
    the mobile device further includes
        an information transmitting section configured to transmit to the server the user information and the identification information received by the identification information receiving section in association with the user information and
        a distance detecting section configured to detect an inter-device distance between the mobile device and the image forming apparatus according to intensity of the radio waves sent by the identification information sending section of the image forming apparatus,
    the server further includes
        a specific operation performing section configured to perform a specific operation for causing the image forming apparatus corresponding to the identification information transmitted by the information transmitting section in association with the user information to execute a print job based on the print data that is managed by the print data managing section in association with the user information transmitted by the information transmitting section,
        a job retention instructing section configured to cause, via transmission of print data managed by the print data managing section of the server to the image forming apparatus, the image forming apparatus to retain a print job based on the print data in a standby state, and
        a job suspending section configured to causes, when the image forming apparatus is incapable of retaining a new print job due to absence of a sufficient vacant area of a storage region in the image forming apparatus in a situation in which the job retention instructing section causes the image forming apparatus already retaining a print job to retain the new print job, the image forming apparatus to suspend execution of the print job already retained in the image forming apparatus and the new print job in descending order of inter-device distances transmitted by the information transmitting section of the mobile device in association with the user information managed by the print data managing section of the server in association with the print data on which the print jobs are based,
    the information transmitting section of the mobile device transmits to the server the inter-device distance detected by the distance detecting section in association with the user information, and
    the specific operation performing section of the server performs the specific operation in a stepwise manner according to the inter-device distance transmitted by the information transmitting section.

2. The printing system according to claim 1, wherein the specific operation includes operation to return from a sleep state the image forming apparatus corresponding to the identification information transmitted by the information transmitting section of the mobile device.

3. The printing system according to claim 1, wherein the specific operation includes operation to cause, via transmission of print data managed by the print data managing section of the server in association with the user information transmitted by the information transmitting section of the mobile device to the image forming apparatus corresponding to the identification information transmitted by the information transmitting section of the mobile device in association with the user information, the image forming apparatus to retain a print job based on the print data in the standby state.

4. The printing system according to claim 1, wherein the specific operation includes operation to cause, via causing the image forming apparatus corresponding to the identification information transmitted by the information transmitting section of the mobile device in association with the user information to render as a print job print data managed by the print data managing section of the server in association with the user information transmitted by the information transmitting section of the mobile device, the image forming apparatus to retain the print job based on the rendered print data in the standby state.

5. The printing system according to claim 1, wherein the specific operation includes operation to cause the image forming apparatus corresponding to the identification information transmitted by the information transmitting section of the mobile device in association with the user information to execute a print job based on print data managed by the print data managing section of the server in association with the user information transmitted from the information transmitting section.

6. The printing system according to claim 1, wherein the identification information sending section of the image forming apparatus is provided as a sender that operates independent of the image forming apparatus.

7. The printing system according to claim 1, wherein when the inter-device distance transmitted by the information transmitting section of the mobile device in association with the user information falls in a job retention distance range in which the image forming apparatus is capable of retaining a print job, the job retaining instruction section of the server causes the image forming apparatus to retain the print job based on the print data via transmission of the print data managed by the print data managing section of the server in association with the user information to the image forming apparatus corresponding to the identification information transmitted by the information transmitting section of the mobile device in association with the user information, and in a situation in which the job retention instructing section of the server causes the image forming apparatus already retaining a print job to retain a new print job, when the image forming apparatus is incapable of retaining the new print job due to absence of a sufficient vacant area of the storage region in the image forming apparatus and an inter-device distance transmitted by the information transmitting section of the mobile device in association with the user information managed by the print data managing section of the server in association with print data on which the new print job is based is greater than the print job already retained in the image forming apparatus and the new print job, the job suspending section of the server causes the job retention instructing section to suspend transmission of the print data on which the new print job is based to the image forming apparatus.

8. The printing system according to claim 7, wherein the job retention instructing section of the server serves as the specific operation performing section of the server in a situation in which an inter-device distance transmitted by the information transmitting section of the mobile device falls in the job retention distance range.

* * * * *